Patented June 13, 1950

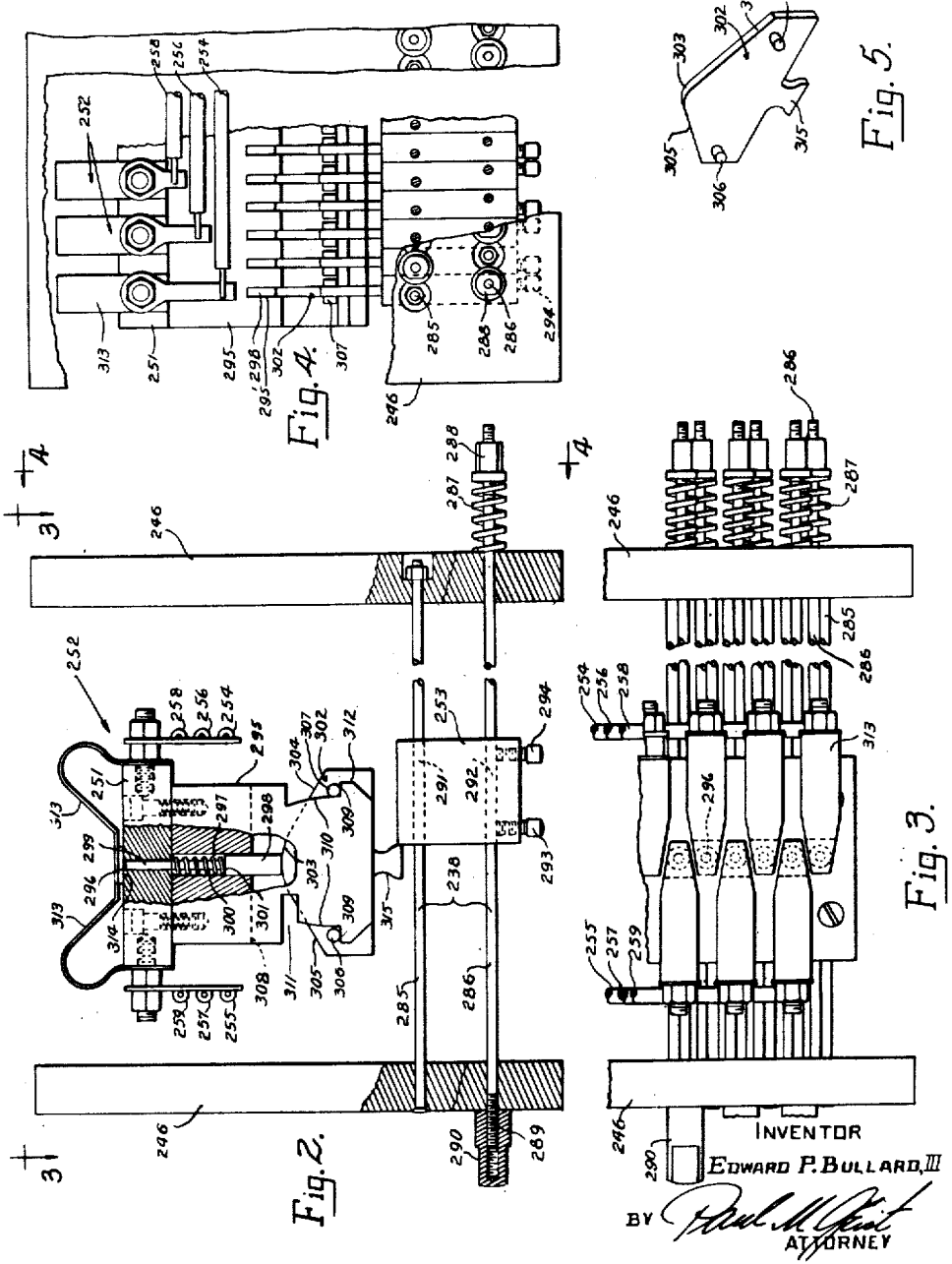

2,511,821

UNITED STATES PATENT OFFICE 2,511,821

CONTROL MECHANISM

Edward P. Bullard, III, Fairfield, Conn., assignor to The Bullard Company, a corporation of Connecticut Original application June 24, 1944, Serial No. 541,986. Divided and this application April 5, 1945, Serial No. 586,799

13 Claims. (Cl. 171—97)

This invention relates to controls for apparatus capable of producing a relatively large number of functions. Particularly, it relates to a control mechanism that will automatically select, in any order within a cycle of operation any one or more functions of which an apparatus is capable, while providing separate means for very accurately determining the extent of each of said functions. This is a division of application Serial Number 541,986, filed June 24, 1944, in the name of Edward P. Bullard, III.

Ordinarily, the accuracy that can be obtained in the operation of machine tools, and particularly in the automatic-cycle operation of machine tools is limited by the accuracy that can be obtained with certain essential elements of the automatic control. For example, when electrical circuits are employed to control the movement of a member, the accuracy that can be obtained is limited by the accuracy of the operating parts of the electrical circuit, and particularly by the accuracy of those parts which are utilized repeatedly to effect stopping of the movement of the member such as trip switches. Machine tool operation requires an accuracy, in stopping the movement of a tool, in the nature of .0005 of an inch. Not only must such accuracy be produced, but it must consistently be maintained regardless of the rate at which the tool is being fed. Prior known electrical equipment including contact-making circuits for controlling the movement of a tool fails to produce accuracies of the order required in machine tool control as set forth above. This is primarily true because detrimental arcing between critical contacts of such equipment produces a molten condition on the contact surfaces, thereby changing the point at which such contacts subsequently make the circuit. In order to overcome this condition, by reducing to a minimum the duration of arcing, prior known switches employ a quick, wide separation of the contacts when it is desired to de-energize such a control circuit. A wiping action between contacts while separating them is also employed to smooth the rough contact surface caused by the molten condition due to detrimental arcing. These prior known switches often employ metal-flexing members that are operated in response to tool movement for producing the quick, wide separation of contacts. The accuracy of such constructions is limited because the metal-flexing members fail to respond at exactly the same point of tool movement upon repeated operations under the same conditions.

Objects of the present invention include the provision of a control mechanism for cycle-operating apparatus of the type that involves means adapted repeatedly to be moved along one or more paths in any order and for any distance; the provision of a control mechanism for a machine including means capable of performing a multiplicity of functions, wherein the control is adapted to render said means fully automatic, but still preserve its manual operativeness; and the provision of a control mechanism for a machine of the type that involves means adapted repeatedly to be moved along one or more paths for different overlapping distances within a cycle of operation.

Other objects of the invention include the provision of an electrical control circuit that can be energized repeatedly by the engagement between movable contact elements at exactly the same point relatively to each contact element; the provision of such an electrical control circuit wherein the surfaces of the energizing contact elements are not altered by continued repetitive use, by detrimental arcing or wear due to a sliding action; the provision of such an electrical control circuit in which the energizing contact elements can be brought into engagement as slowly as desired to energize the circuit without detrimental arcing; the provision of such an electrical control circuit that is de-energized before the contact elements are separated that are employed for energizing it; the provision of an electrical control circuit including a plurality of circuit-energizing contacts, each including movable contact elements, that are successively connected into the circuit and each of which embodies the above-noted characteristics; the provision of such an electrical circuit that is energized by the engagement between one set of contact elements and deenergized by the separation of another set of contact elements, and in which the contact elements of the first set are separated after the separation of the elements of the second set and the provision of an electrical control circuit for a multi-function apparatus wherein the duration of each function is determined by the engagement of separate circuit-energizing contact means that are successively connected into the circuit and in which said circuit embodies all of the above-noted characteristics.

Other objects include the provision of apparatus capable of a relatively large number of functions which embodies means for selecting in any order, a relatively great number of any of said functions within a cycle of operation and including separate electrical switch means for each function within said cycle of operation; the provision of such an apparatus in which each switch is arranged in cooperative position relatively to a separate switch-actuating dog, and in which cooperation between the two is responsive to a function of the apparatus; the provision of such an apparatus wherein the relatively great number of switches and dogs is so constructed that a maximum number is included in a minimum of space; the provision of such an apparatus wherein the switches are actuated by relative movement between them and their dogs in response to the functions of the apparatus; the provision of such an apparatus in which each switch includes single contact means having movable contact elements operable to energize a circuit by the action of a dual-directional-motion actuator; the provision of such an apparatus wherein each switch is so constructed that cooperative abutting engagement between it and its dog occurs completely within a surface of the dog at right angles to the direction of relative movement between the switch and its dog; and the provision of such an apparatus in which each switch employs means for multiplying the relative motion between it and its dog and transmits such amplified motion to the single-contact means through rigid compression members.

Another specific object of the invention is the provision of a control for a machine tool of the pre-settable cycle-operating type involving control means that is moved from position to position for selecting successive functions within a cycle of operation, and wherein the functions are terminated independently of the movement of the control means.

The above, as well as other objects and novel features of the invention, will become apparent from the following specification and accompanying drawings, in which:

Figure 2 is an enlarged detail sectional view taken substantially along line 2—2 of Figure 1;

Figure 3 is a plan view taken along line 3—3 of Figure 2;

Figure 4 is an elevational view taken along line 4—4 of Figure 2; and

Figure 5 is a detail of the apparatus shown in Figure 2.

Figure 1:
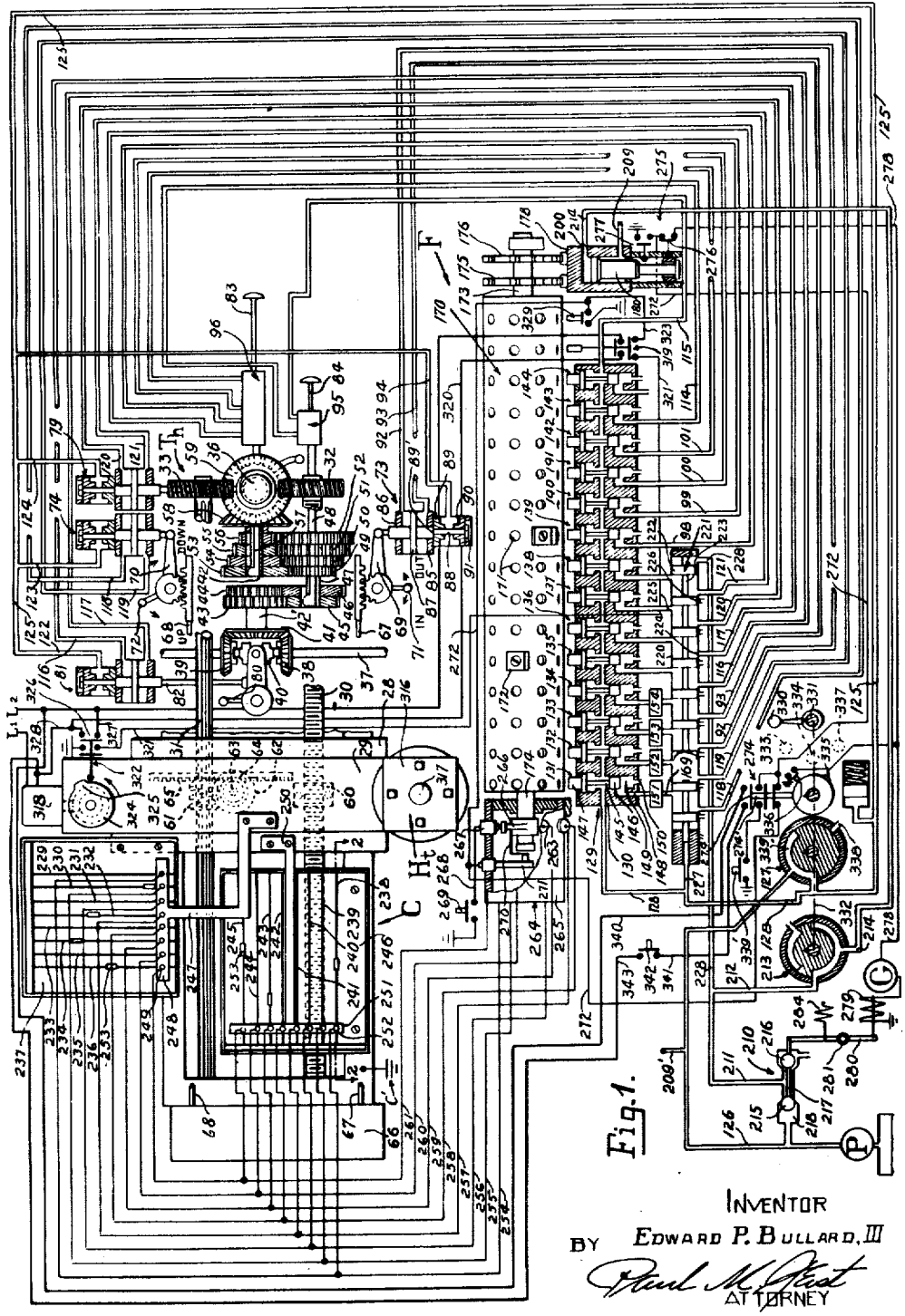
Figure 1 is a schematic layout of the essential features of the invention.

Referring to Figure 1, a feedworks transmission Th includes a shaft 37 that is driven by a headstock transmission not shown. The shaft 37 supports two bevel gears 38, 39 for free rotation. A clutch 40 is located between the gears 38 and 39 and it is splined to the shaft 37. Both gears 38 and 39 mesh with a bevel gear 41. The gear 41 is fixed to a shaft 42'. Spur gears 43 and 44 are fixed to the shaft 42' and they mesh with corresponding gears 45 and 46 journaled on a shaft 47. The shaft 47 is hollow and a diving key 48 extends thereinto. The key 48 is adapted to be moved from engagement with gear 45 to engagement with gear 46 selectively for a purpose to be described later. Spur gears 49, 50, 51 and 52 are fixed to the tubular shaft 47. Spur gears 53, 54, 55 and 56 are journaled on another shaft 42. The portion of shaft 42 on which gears 53 to 56 are journaled is of tubular construction for receiving a diving key 57. A bevel gear 58 is fixed to the end of shaft 42 and it meshes with a bevel gear 59 fixed to a worm 36. From the foregoing it is evident that worm 36 may be rotated in either direction at any one of eight different speeds depending upon the positions of diving keys 48 and 57 and clutch 40.

A screw 30 threads into a boss 60 on the back of a saddle 28. A splined shaft 31 supports a worm 61 for sliding movement therealong. The worm 61 meshes with a worm wheel 62 on the back of saddle 28. The worm 62 is fixed to a shaft 63 that also supports a spur gear 64 in mesh with a rack 65 on the back of a slide 29. The shaft 63 is journaled in bearings on saddle 28. Rotation of screw 30, therefore, moves saddle 28 and slide 29 horizontally and rotation of splined shaft 31 moves slide 29 along the bearings formed therefor in saddle 28. Accordingly, moving worm 36 into engagement with gears 32 and 33 will cause the movement of head Ht along its respective paths in either direction at any one of eight different speeds depending upon the position of clutch 40, key 48 and key 57.

A housing 66 is attached to the end of a cross rail C opposite that which supports the feed works Th. This housing is adapted to support continuously-driven oppositely-rotatable means that is adapted to be connected to and disengaged from the screw 30 and the splined shaft 31 by the selective operation of rods 67 and 68. These rods are axially movable by the oscillation of crank arms 69 and 70. This construction provides means for moving the turret head Ht along either of its paths at relatively fast traverse speeds.

Crank arms 69 and 70 are adapted manually to be operated by hand levers 71 and 72. These crank members are also adapted to be hydraulically actuated by pistons within cylinders 73 and 74. The pistons within these cylinders are connected to the crank members 69 and 70 by the connecting rods 75 and 76, respectively. The worm 36 is adapted manually to be moved into and out of engagement with gears 32 and 33 by a hand lever (not shown) which latter is operated by a piston in a cylinder 79. The reversing clutch 40 is adapted manually to be moved by a hand lever 80 fixed to the clutch 40. Clutch 40 is adapted hydraulically to be actuated by a piston within a cylinder 81 which is connected to the clutch 40 by a link 82. The diving key 57 is adapted manually to be moved by a hand lever 83, while the diving key 48 is manually operable by a hand lever 84.

The piston and cylinder constructions 73, 74, 79 and 81 are the same and, therefore, only one will be described. The cylinder 73 includes a dividing partition 85 that cooperates with an end 86 to support piston 87. The piston 87 includes end portions that extend through the partition 85 and the end portion 86. A rod 88 fixed to the piston 87 extends beyond the partition 85 into another chamber of cylinder 73. Oppositely-disposed discs 89 and 90 are mounted on the rod 88 for free movement relatively to said rod. A nut 91 is screwed onto the end of the rod 88 in engagement with the disc 90. The disc 89 abuts against a shoulder 89' between rod 88 and the one end portion of piston 87. Fluid under pressure is adapted to be selectively admitted to opposite faces of piston 87 through conduits 92 and 93. Constant pressure is adapted to be supplied through a conduit 94 to the chamber of cylinder 73 that contains the discs 89 and 90. The effective pressure area of the discs 89, 90 is less than the effective pressure area of the piston 87. Consequently, admission of pressure to the cylinder 73 through the lines 92 and 93 will cause the piston 87 to move within the cylinder 73. Removal of pressure from both lines 92 and 93 will effect the instantaneous centralization of the piston 87 within the cylinder 73. This construction provides means for positively moving the cranks 69, 70, clutch 40 and worm 36 to their active positions and causes neutralization of each of these elements upon removal of the pressure from the corresponding pistons thereof.

The diving keys 48 and 57 are adapted hydraulically to be actuated by cylinder mechanisms 95 and 96 (see application, Serial No. 541,986 filed June 24, 1944).

Fluid under pressure is adapted selectively to be supplied to the piston mechanism 81 through conduits 116 and 117. Fluid pressure is adapted to be supplied to the piston mechanism 74 through conduits 118 and 119. Fluid under pressure is adapted to be supplied to the piston mechanism 79 through conduits 120 and 121. Fluid under constant pressure is adapted to be supplied to piston mechanisms 81, 74 and 79 through conduits 122, 123 and 124, respectively. This constant pressure fluid is supplied to the conduits 122, 123 and 124, as well as to the conduit 94 by a pipe 125 that leads from a main source of fluid supply P through a duct 126 and a valve 127.

Conduits 92, 93, 98, 99, 100, 101, 114, 115, 116, 117, 118, 119, 120 and 121 are adapted to be supplied with fluid under pressure from the main source P by a pipe 128 that leads from valve 127 and is connected to an elongated valve body 129. The valve body 129 is provided with a centrally-disposed longitudinally extending passage 130 throughout its length. It is also provided with a plurality of transversely-disposed valve chambers of identical consctruction within which are located valve plungers 131 to 144, inclusive, for conduits 92, 93, 98, 99, 100, 101, 114, 116, 117, 118, 119, 120 and 121. Valve plunger 144 is employed as a spare and is not shown connected to a conduit. Since all the valve plungers 131 to 144 are identical, only plunger 131 will be specifically described. It comprises a valve stem 145 having a valve head 146 at its lower end and an upper head 147 at its upper end. The area of the head 146 is substantially less than that for the head 147. Consequently, the constant supply of fluid under pressure within the valve body 129 maintains the plunger 131 in its upper position. With plunger 131 in its upper position, the lower head 146 prevents the passage of fluid under pressure through a discharge duct 148 which is connected to the conduit 118. Upon downward movement of the plunger 131, the head 146 thereof moves into a chamber 149 having an exhaust 150, whereupon fluid from line 128 may pass said head and empty into duct 148.

The conduits 118, 119, 92 and 93 control the operation of the arms 70 and 69, respectively, for rendering effective the quick traverse movement of the head Ht. During a machining operation it is necessary to provide a dwell at the end of any feeding operation for the purpose of cleaning up the work. Accordingly, time delay mechanisms 151, 152, 153 and 154 are provided between the valve body 129 and the conduits 118, 119, 92 and 93. Reference is made to the parent application for specific details of construction.

The plungers 131 to 144, inclusive, are adapted selectively to be depressed by the step-by-step rotation of a function drum 170 about a horizontal axis. The drum 170 is provided with a series of circumferentially-disposed openings 171 forming means whereby dogs 172 can be attached to said drum. There is a series of such holes 171 in line with each of the plungers 131 to 144, inclusive, as well as other such series of openings for purposes to be described later. The drum 170 is shown in the form of a cylinder having trunnions 173 and 174 which are supported in the usual manner in bearings in the housing of the function control mechanism F. The drum 170 is adapted to be indexed a predetermined number of degrees about its horizontal axis intermittently so that the dogs located on the drum in a longitudinally-disposed row of openings 171 will become effective to depress the selected plungers 131 to 144, thereby to operate the machine in a manner to be described later. Ratchet wheels 175 and 176 are fixed to the trunnion 173 of the drum 170. The ratchet wheel 175 is employed to index the drum 170, while ratchet wheel 176 serves as a retaining means for locking the drum 170 in each of its indexed positions.

Pressure fluid from a main source P branches off from the line 126 through a valve 210, lines 211, 212, a manually-operable valve 213 to be described later, and a conduit 214 that is connected to an inlet 200 of the housing 178. The valve 210 comprises ball members 215, 216 that are joined by a slender rod 217. The balls 215 and 216 are adapted to seat in a valve body 218 to prevent the passage of fluid thereby. The construction and arrangement of parts are such that when ball 215 is engaged with its seat, ball 216 is out of engagement with its seat, and vice versa. Accordingly, movement of the balls 215, 216 to the left, as viewed in Figure 1, will permit fluid under pressure to be admitted through lines 211, 212, manually-operable valve 213, line 214, to inlet 200. Upon release of the force moving balls 215 and 216 to the left, as viewed in Figure 1, they will move to the right under the combined influence of the pressure from the source P acting against the ball 215 and a spring 284, thereby cutting off the flow of fluid under pressure to the inlet 200. The constant supply of pressure to inlet 209 is supplied from the branch conduit 209'.

Intermittent operation of the valve 210 will cause the intermittent indexing of the function drum 170 to effect the depression of selected of the valves 131 to 144 for controlling the operation of the machine tool. In order to reduce to an absolute minimum the time required to exhaust the valve piston mechanisms 81, 74, 79 and 73, means is provided for effecting their exhaust independently of the indexing of the function drum. If the exhausting of these piston mechanisms were effected by the upward movement of the valve members 131 to 144, instantaneous action could not be obtained since a definite time interval is required in moving the drum from one position to the next. Accordingly, the present invention overcomes this difficulty by providing a unique valve mechanism between the piston mechanisms 73, 74, 79 and 81 and the valve body 129 including the time delay devices 151, 152, 153 and 154. This valve mechanism is designed to effect instantaneous exhausting of the piston mechanisms 73, 74, 79 and 81 independently of the action of the indexing mechanism for the function drum 170. It comprises an elongated bore 220 within which a plurality of indipendent piston members 221 is adapted to be reciprocated for a limited distance. Each of the piston members 221 is identical and comprises a head portion 222 and a stem portion 223. They are arranged in aligned abutting relation. The bore 220 is provided with a plurality of ports 224 to which the conduits 118, 119, 92, 93, 116, 117, 120 and 121 are connected. It is also provided with a plurality of inlets 225 to which the chambers for valves 131, 132, 133, 134, 135, 136, 137 and 138 are connected. The bore 220 is also provided with a plurality of exhaust ports 226. The construction and arrangement of parts are such that normally the piston members 221 are in abutting relation, as shown in Figure 1, with their head portions 222 overlapping or covering the exhaust ports 226 and permitting free passage between the valve body 129 and the conduits 118, 119, 92, 93, 116, 117, 120 and 121. Constant pressure is supplied to the left-hand end of the bore 220 through a branch 227 of the conduit 128, normally maintaining the pistons 221 in the position shown in Figure 1. A branch line 228 of the line 211 is connected to the right-hand end of bore 220 and acts upon the head 222 of the rightward-most piston 221. Accordingly, upon the intermittent actuation of valve 210, the piston members 221 will be moved leftwardly such that the exhaust ports 226 will be uncovered and the inlet ports 225 will be covered. When this occurs, the conduits 118, 119, 92, 93, 116, 117, 120 and 121 will be instantly exhausted before indexing of drum 170 will take place by the action of the fluid under pressure in line 214. This construction greatly increases the accuracy of the feed knock-out, as well as the traverse knock-out. That is, neutralizing of the feed and traverse clutches and drop worm 36 is instantly accomplished regardless of the time required to index drum 170.

That which has been described comprises selectively-operable mechanism for causing the head Ht to produce any function of which it is capable in accordance with the operation of valves 131 to 144. The extent of any function selected by the drum 170 is adapted to be determined by mechanism associated with the movable head Ht. This mechanism is designed to provide a separate function determining means for each function called for by a setting of dogs 172 along a longitudinally-disposed row of openings 171 on drum 170. It comprises in the present embodiment, switch-trip supporting means 229 to 236, inclusive, one for each of the longitudinally-disposed rows of holes 171 on the drum 170. Although only eight such supporting means and eight longitudinally-disposed rows of dogs 172 on drum 170 are shown, it is to be understood that any number of such supporting means and longitudinal rows of dogs 172 may be employed. In practice, it has been found that about forty such supporting means and rows of dogs on drum 170 are adequate. The switch-trip supporting means are mounted on a panel 237 rigidly attached to the saddle 28 of the machine. Similarly, supporting means 238, 239, 240, 241, 242, 243, 244 and 245 are mounted on a panel 246 fixed to the cross rail C. An arm 247 is fixed to and movable with the slide 29 and includes a right-angularly disposed portion 248 having switches 249 above the supporting means 229 to 236, inclusive. An arm 250 is fixed to, and movable with the saddle 28 along the cross rail C and it includes a right-angularly disposed portion 251 having switches 252 above each of the supporting means 238 to 245, inclusive. The construction and arrangement of the parts are such that movement of slide 29 along the bearings in the saddle 28 will cause the switches 249 to move along means 229 to 236, inclusive, and horizontal movement of saddle 28 will cause the switches 252 to move along the means 238 to 245, inclusive.

Adjustably-mounted dogs 253 are adapted to be located along each of the supporting means 229 to 236 and 238 to 245, inclusive. The switch 249 above means 229 is connected to the switch 252 above means 238 by a common wire 254. Switches 249 and 252 above means 230 and 239 are connected by a common wire 255. Switches 249 and 252 above means 231 and 240 are joined by wire 256. Wire 257 joins switches 249 and 252 above means 232 and 241. Wire 258 joins switches 249 and 252 above means 233 and 242. Switches 249 and 252 above means 234 and 243 are joined by wire 259. Wire 260 joins switches 249 and 252 above means 235 and 244. Switches 249 and 252 above means 236 and 245 are joined by wire 261. The specific construction of the switches 249, 252 and the switch-tripping dogs 253 will be described later.

Each wire 254 to 261, inclusive, is connected to a separate contact 263 of a distributor 264 that is mounted about trunnion 174 of function drum 170. The contacts 263 are located about the periphery of a non-rotatable cylindrical member 265 of the distributor 264 such that wires 254 to 261 are successively adapted to be contacted by a brush arm 266 fixed to and rotatable with the drum 170. A binding post 267 is provided with the group of contacts 263 as the "no-function" position of the drum. The binding post 267 is provided with a line 268 having a manually operated push-button 269 between the binding post 267 and a ground connection for the purpose of initiating a cycle of operation as will be described later. The brush arm 266 includes a contact member 270 that is maintained in rubbing engagement with a fixed contact 271 to which another binding post is fixed and mounted in the non-rotatable cylindrical member 265 of distributor 264. The contact 271 is provided with a conductor 272 that extends through a switch 274, thence to a compound switch mechanism 275 adjacent the drum-indexing mechanism. The switch 275 includes a normally closed contact 276 and a normally open contact 277. The conductor 272 is connected to one pole each of the switches 276 and 277. The opposite pole of the switch 277 is grounded and the opposite pole of the switch 276 is connected by a conductor 278 that extends to and is connected with a source of electrical energy G. The source of energy G also is in series connection with a solenoid 279, the opposite side of which is grounded. The solenoid 279 is adapted upon energization to cause the pivoting of an arm 280 about a pivot 281 to operate the valve 210.

Operation of the switches 249 and 252 grounds the wire 254 to 261 that is connected to it, to create a circuit through the solenoid 279. Assume that brush 266 is in contact with the binding post 263 for the conductor 259 that is common to the switches 249 and 252 for the switch-trip supporting means 234 and 243, respectively. Further, assume that the head Ht is moving along one of its paths, for example, that defined by the bearings in the saddle 28. Since head Ht is not moving horizontally, no dog 253 will be employed on means 243. When the switch 249 above means 234 engages the dog 253 thereon, said switch will operate so that current will flow from the generator G through the conductor 278, the normally-closed switch 276 to the conductor 272, the normally-closed portion of switch 274, the contact members 271, 270, the brush 266, binding post 263, conductor 259, switch 249, thence to the ground C' on the frame of the machine, back to the one side of the solenoid 279 and finally to the generator G.

Energization of the solenoid 279 will cause the valve 210 to operate such that the balls 215, 216 move leftwardly, as viewed in Figure 1, whereupon pressure from the source P is adapted to pass the ball 215, enter the conduit 211 and move the piston members 221 leftwardly, thereby to exhaust all of the lines 118, 119, 92, 93, 116, 117, 120 and 121. Such action will immediately neutralize all of the operating elements of the feedworks Th. At the same time, this fluid under pressure will pass through branch 212, valve 213, conduit 214, and effect the indexing of the drum 170 to its next succeeding position. It will be observed, however, that as soon as the drum 170 begins to index, the brush arm 266 moves off the binding post 263, thereby removing the ground C' from the circuit including the solenoid 279. Accordingly, in order to effect a complete index of drum 170, it is necessary to provide a substitute for ground C' while the arm 266 is moving between successive binding posts 263. This is accomplished by the normally-open switch 277 of the compound switch 275.

As previously mentioned, the practical embodiment of the invention employs as many as forty or more means 238 that support dogs 253 and an equal number of longitudinally-disposed rows of openings 171 on drum 170. Accordingly, forty or more individual switches 252 are required, one for each switch-trip supporting means 238; and an equal number of switches 249 is also required for the trip-supporting means 229, etc.

Referring to Figure 2, the uprights comprising frame 246 support the switch-trip supporting means 238 which includes a wire 285 rigidly fixed between the uprights of frame 246, and a wire 286 located in a vertical plane spaced from that including wire 285.

The wire 286 is mounted within openings in the uprights of the frame 246 in parallel relation to wire 285. The wire 286 is adapted to be axially moved for a purpose to be described later. A compression spring 287 surrounds the one end of the wire 286 outside of the frame 246. An adjustable nut 288 is threaded onto the end of rod 286 for varying the compression of the spring 287. The end of rod 286 opposite that supporting spring 287 extends through one upright of the frame 246 and is provided with a micrometer thread 289 and a micrometer nut 290. By turning the nut 290, the wire 286 may be axially moved in either direction since the spring 287 maintains a constant tension on the wire.

The dog 253 comprises a relatively narrow rectilinear body having passages 291 and 292 extending through it for the reception of the wires 285 and 286. Lock bolts 293 and 294 are threaded into the lower end of the dog 253. The bolts 293 and 294 abut against the wire 286. Loosening of bolts 293 and 294 will permit the adjustment of the dog 253 axially along the wires 285 and 286 for approximately locating the dog 253 in its correct position. Tightening of the bolts 293 and 294 will fix the dog 253 to the wire 286. With the dog fixed to the wire 286, accurate adjustment of the dog 253 relatively to the switch 252 may be effected by turning the micrometer nut 290 on the one end of wire 286. The micrometer thread 289 of the rod 286 that receives the nut 290 comprises 40 threads to the inch so that a complete turn of nut 290 will move dog 253 an amount equal to .025 inch. A dial is provided with each nut 290 of ten equal divisions so that it is possible accurately to move dog 253 an amount equal to .0025 inch, and it is possible to estimate movements of dog 253 of less than .001 inch.

Figures 2, 3, 4 and 5 show one switch 252 in detail with its attending parts. Since all switches 249 and 252 are identical, only one will be described in detail. In the present embodiment of the invention, the switch-supporting members 248 and 251 are moved over their respective switch-trip supporting means and said means remain stationary. Of course, whether the supporting means move or the switch supports move is immaterial, so long as relative motion between the two is provided.

The novel circuit includes a series connection between four essential elements, including: (1) a source of voltage, which in the present embodiment is about thirty-two volts, and is represented by generator G, Fig. 1; (2) an electrically operated load device which in the present embodiment is solenoid 279; (3) an electrical contact adapted to be operated relatively quickly and capable of relatively wide separation when open, which comprises arm 266 of distributor 264; and (4) a circuit-energizing contact which, in the present embodiment, is operated in response to the movement of the tool turret and comprises switch 252. The operation of the circuit including these four essential elements must be such that the relatively quick-acting contact is first closed which establishes the circuit as far as the circuit-energizing contact or switch 252. When the turret head reaches its destination, switch 252 is operated thereby energizing the circuit. Energization of the circuit operates the solenoid 279 which in turn actuates the quick-acting contact 266 to de-energize the circuit. Finally, the circuit-energizing contact (switch 252) is opened only after the quick-acting contact has been opened. The above-described operation of the circuit prevents detrimental arcing of the circuit-energizing contact (switch 252), which is the key to the accuracy of the control. Accordingly, the surfaces of the movable parts of the contact of switch 252 are never altered by melting due to detrimental arcing.

The member 251 which supports the switches 252 is composed of insulating material and is fixed to bracket 250 that is moved between the uprights of the frame 246 in response to the horizontal movement of head Ht. A metallic switch-supporting body 295 extending throughout the entire length of the insulating member 251 is rigidly bolted to it. The member 251 is provided with a plurality of holes 296 that extend through the member 251 and are aligned as shown in Figure 3. The metallic body 295 is provided with an identical series of holes or bores 297 that are slightly larger in diameter, but axially aligned relatively to the holes 296. A plunger 298 is located in each of the holes 297 and includes a stem portion 299 that extends upwardly through the hole 296 in the insulating block 251. A coil spring 300 is located within the holes 297 between the block 251 and a shoulder 301 on the plunger 298. The lower end of the plunger 298 rests on an actuating member 302. The actuating member 302 is shown in Figure 5 and comprises a flat plate having an arcuate portion 303 joined by tangential portions 304, 305 on each side thereof. The actuator 302 is also provided with trunnions 306, 307 that extend through and beyond the actuator 302 for equal distances on each side of said actuator. The lower portion of the body 295 is provided with a series of slots 295' each of which extends from the bottom of the member 295 upwardly to the dotted line 308. There is a slot 295' aligned with each of the holes 297 and plungers 298. The intersection between each of the slots 295' and the lower end of its respective hole 297 forms a seat below which the lower end of plunger 298 will not move. A trunnion-receiving portion 309 is provided on each side of the block 295 at the lower end of an arcuate surface 310. The one arcuate surface 310 is slotted at 311 for facilitating the assembly of the actuator 302. This assembly is accomplished by locating the trunnion 306 within the slot 311, thereby permitting the trunnion 307 on the opposite end of the arcuator 302 to clear the shoulder 312 of the body 295 and become seated in its trunnion-receiving portion 309. Seating of the trunnion 307 adjacent the shoulder 312 locates the opposite trunnion 306 beyond the slot 311 so that it is urged downwardly to its trunnion-receiving portion 309 by the action of the spring-pressed plunger 298. As shown in Figure 2, a slight clearance is provided between the trunnions 306, 307 and the arcuate walls 310. This clearance is always taken up, as evidenced in Figure 2 by the absence of clearance about trunnion 307, before the switch 252 is operated by dog 253.

The construction and arrangement of the parts of the switch 252 and its attending parts are such that a great number of switches 252 can be located within a minimum of space. The relatively thin, flat plates 302, together with the overall length of the trunnions 307 extending on both of its sides, need not exceed the maximum diameter of the plunger 298 whereby the only limitation on spacing of switches 252 is the necessary wall thickness between bores 297. In the present embodiment, the plungers 298 are located on 7/32 inch diameters, which gives some idea of the number of switches 252 that can be located within a given space.

Spring conductors 313 are provided alternately on each side of the insulating member 251 such that their free ends overlie the tops of the holes 296 within which the portions 299 of the plungers 298 are located. Each of these free ends of the conductors 313 is provided with a hardened steel contact portion 314 directly over the holes 296. The spring 313 resiliently urges this contact firmly into engagement with the top of the rigid body member 251. A slight clearance is provided between the top of the stem portion 299 and the hardened steel contact 314. The fixed end of each conductor 313 is connected to one of the wires 254 to 261 that lead to the distributor 264.

Each of the actuators 302 is provided with a depending portion 315 that extends downwardly to a point where it will engage either side of the dog 253. An abutting engagement between the portion 315 and either face of dog 253 always occurs totally within a surface that is at right angles to the direction of relative movement between the dog 253 and switch 252. Accordingly, slight transverse movement of dog 253 relatively to the direction of the relative movement between it and switch 252 does not affect the point at which contact between 314 and the upper end of stem 299 occurs. Engagement between 315 and dog 252 in any other manner will introduce detrimental inaccuracies to the apparatus. Movement of the block 251 rightwardly as shown in Figure 2 will cause the actuator 302 to pivot about the trunnion 307 adjacent shoulder 312 causing the arcuate surface 303 to force the plunger 298 upwardly against the action of spring 300. Upward movement of the plunger 298 causes abutting contact to be established between the contact 314 and the top of the stem 299, thereby grounding the circuit including the conductor 254 through the ground C'. Accordingly, no wiping action between contact 314 and the top of stem 299 occurs which, therefore, eliminates all wear between said contacts. Continued movement of the member 251 rightwardly permits the free passage of the unit over the dog 253 without affecting the operability of the switch because spring 313 yields and always returns contact 314 to its initial position in firm contact against the rigid body 251. Since the construction of the trunnions 306, 307 and the surfaces 310 are identical, movement of the member 251 leftwardly after it has passed the dog 253 causes depending portion 315 to engage dog 253 well within the surface of its righthand side and, therefore, causes an identical action of the switch 252, as previously described.

As previously stated, switches 252 consume very little space. In order that the combined unit including all switches 252 and dogs 253 will occupy a minimum of space, the micrometer adjusting means including the nuts 290 and the resiliently mounted wires 286 alternate in position with the fixed wires 285 in adjacent dogs 253. By this means, succeeding sets of wires 285, 286 can be located so close to each other that their respective adjusting mechanisms overlap.

There are as many switches 252 including plungers 298 and actuators 302 as there are switch-trip supporting means 238 to 245 inclusive; and there are as many switches 249, identical with switches 252, as there are switch-trip supporting means 229 to 236 inclusive. All of these switches 252 and 249 are identical, as well as each of the switch-trip supporting means Although the various features of the improved control mechanism have been shown and described in detail to fully disclose one embodiment of the invention, it will be evident that numerous changes may be made in such details, and certain features can be used without others, without departing from the principles of the invention.

What is claimed is:

1. An electrical circuit for a translatable device, the termination of the movements of which is to be repeated with extreme accuracy, comprising in series arrangement, a source of voltage; an operating means for initiating the movements of said device and adapted to be energized by said source of voltage; contact means capable of relatively wide separation and adapted to be opened relatively quickly by the action of said operating means; other contact means adapted to be closed to energize said circuit; and means movable with said translatable device for closing said other contact means at any desired rate, the construction and arrangement of parts being such that said other contact means is adapted to be opened only after the operation of said operating means.

2. An electrical circuit for a translatable device, the termination of the movements of which is to be repeated with extreme accuracy, comprising in series arrangement, a source of direct current; an operating means for initiating the movements of said device and adapted to be energized by such source of direct current; contact means capable of relatively wide separation and adapted to be opened relatively quickly by the action of said operating means; other contact means adapted to be closed to energize said circuit; and means movable with said translatable device for closing said other contact means at any desired rate, the construction and arrangement of parts being such that said other contact means is adapted to be opened only after the operation of said operating means.

3. An electrical circuit for a translatable device, the termination of the movements of which is to be repeated with extreme accuracy, comprising in series arrangement, a source of voltage; operating means for initiating the movements of said device and adapted to be energized by said source of voltage; a plurality of contact means capable of relatively wide separation and adapted successively to be connected into said series circuit and to be opened relatively quickly by the action of said operating means; a plurality of other contact means for energizing said circuit, at least one for each of said quick-opening contact means, adapted successively to be connected into said series circuit simultaneously with its corresponding quick-opening contact means by the action of said operating means; and means movable with said translatable device for closing said other contact means at any desired rate for energizing said circuit, the construction and arrangement of the parts being such that the opening of the other said contact means which was closed to energize said circuit occurs subsequently to the opening of its corresponding quick-opening contact means.

4. An electrical circuit for a translatable device, the termination of the movements of which is to be repeated with extreme accuracy, comprising in series arrangement, a source of direct current; an operating means having a substantial resistance for initiating the movements of said device and adapted to be energized by said source of current; a plurality of contact means capable of relatively wide separation and adapted successively to be connected into said series circuit and to be opened relatively quickly by the action of said operating means; a plurality of other contact means for energizing said circuit, at least one for each of said quick-opening contact means, adapted successively to be connected into said series circuit simultaneously with its corresponding quick-opening contact means by the action of said operating means; and means movable with said translatable device for closing said other contact means at any desired rate for energizing said circuit, the construction and arrangement of parts being such that the opening of the other said contact means which was closed to energize said circuit occurs subsequently to the opening of its corresponding quick-opening contact means.

5. An electrical circuit for a translatable device, the termination of the movements of which is to be repeated with extreme accuracy, comprising in series arrangement, a source of voltage; an operating means for initiating the movements of said device and adapted to be energized by said source of voltage; a plurality of contact means capable of relatively wide separation and adapted successively to be connected into said series circuit and to be opened relatively quickly by the action of said operating means; a plurality of sets of contact means each set including a plurality of contacts arranged in parallel relation relatively to each other, and at least one of said contacts being provided for each of said quick-opening contact means, each set of said contact means being adapted successively to be connected into said series circuit simultaneously with its corresponding quick-opening contact means by the action of said operating means; and means movable with said translatable device for closing any of said parallel-arranged contact means at any desired rate for energizing said circuit, the construction and arrangement of the parts being such that any parallel-arranged contact that has been closed to energize the circuit is opened only after the opening of its corresponding quick-opening contact means.

6. An electrical circuit comprising in series arrangement a source of direct current; an operating means adapted to be energized by said source of direct current; contact means capable of relatively wide separation and adapted to be opened relatively quickly; other contact means adapted to be closed to energize said circuit; and means for closing said other contact means at any desired rate, the construction and arrangement of parts being such that said other contact means is adapted to be opened only after the opening of said quick-opening contact means.

7. An electrical circuit comprising in series arrangement, a source of voltage; operating means adapted to be energized by said source of voltage; a plurality of contact means capable of relatively wide separation and adapted successively to be connected into said series circuit and to be opened relatively quickly; a plurality of other contact means for energizing said circuit, at least one for each of said quick-opening contact means, adapted successively to be connected into said series circuit simultaneously with its corresponding quick-opening contact means; and means for closing said other contact means at any desired rate for energizing said circuit, the construction and arrangement of the parts being such that the opening of the other said contact means which was closed to energize said circuit occurs subsequently to the opening of its corresponding quick-opening contact means.

8. An electrical circuit comprising in series arrangement, a source of direct current; an operating means adapted to be energized by said source of direct current; a plurality of contact means capable of relatively wide separation and adapted successively to be connected into said series circuit and to be opened relatively quickly; a plurality of sets of contact means, each set including a plurality of contacts arranged in parallel relation relatively to each other, and at least one set of said contacts being provided for each of said quick-opening contact means, each set of said parallel-arranged contact means being adapted successively to be connected into said series circuit simultaneously with its corresponding quick-opening contact means; and means for closing any of said parallel-arranged contact means at any desired rate for energizing said circuit, the construction and arrangement of the parts being such that any parallel-arranged contact that has been closed to energize the circuit is opened only after the opening of its corresponding quick-opening contact means.

9. An electrical circuit comprising in series arrangement, a source of direct current; an operating means adapted to be energized by said source of direct current; a plurality of contact means capable of relatively wide separation and adapted successively to be connected into said series circuit and to be opened relatively quickly by the action of said operating means; a plurality of sets of contact means, each set including a plurality of contacts arranged in parallel relation relatively to each other, and at least one set of said contacts being provided for each of said quick-opening contact means, each set of said contact means being adapted successively to be connected into said series circuit simultaneously with its corresponding quick-opening contact means by the action of said operating means; and means for closing any of said parallel-arranged contact means at any desired rate for energizing said circuit, the construction and arrangement of the parts being such that any parallel-arranged contact that has been closed to energize the circuit is opened only after the opening of its corresponding quick-opening contact means.

10. An electrical circuit comprising in series relation, a source of voltage; electrically operated means having a substantial resistance; contact means; means for closing said contact means at any desired rate for energizing said circuit; and means for de-energizing said circuit by the operation of said electrically-operated means prior to the opening of said contact means.

11. An electrical circuit comprising in series relation, a source of voltage; a plurality of contact means; means for successively connecting and disconnecting said contact means into and from said series circuit; means for closing each of said contact means for energizing said circuit when it is connected into said circuit; and means for operating said connecting and disconnecting means prior to the opening of the contact means that energized said circuit.

12. An electrical circuit comprising in series relation, a source of direct current; a plurality of contact means; means for successively connecting and disconnecting said contact means into and from said series circuit; means for closing each of said contact means for energizing said circuit when it is connected into said circuit; and means for operating said connecting and disconnecting means prior to the opening of the contact means that energized said circuit.

13. An electrical circuit comprising in series relation, a source of voltage; a plurality of sets of contact means, each set comprising a plurality of contact means arranged in parallel relation relatively to each other; means for successively connecting and disconnecting said sets of contact means into and from said series circuit; means for closing each of said contact means for energizing said circuit when it is connected into said circuit; and means for operating said connecting and disconnecting means prior to the opening of the parallel-arranged contact means that last energized said circuit.

EDWARD P. BULLARD, III.

REFERENCES CITED

The following references are of record in the file of this patent:

UNITED STATES PATENTS

| Number | Name | Date |
|---|---|---|
| 481,785 | Cravath | Aug. 30, 1892 |
| 933,211 | Van Valkenburg | Sept. 7, 1909 |
| 1,850,321 | Greenwood | Mar. 22, 1932 |
| 1,894,458 | Altgelt | Jan. 17, 1933 |
| 2,065,859 | Kirk | Dec. 29, 1936 |
| 2,331,997 | Mensenkamp | Oct. 19, 1943 |
| 2,339,839 | Curtis | Jan. 25, 1944 |
| 2,382,078 | Long | Aug. 14, 1945 |